United States Patent
Fontoura et al.

(10) Patent No.: US 7,502,802 B2
(45) Date of Patent: Mar. 10, 2009

(54) OPTIMIZING CURSOR MOVEMENT IN HOLISTIC TWIG JOINS

(75) Inventors: Marcus F. Fontoura, Los Gatos, CA (US); Vanja Josifovski, Los Gatos, CA (US); Eugene K. Shekita, San Jose, CA (US); Beverly Yang, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/475,807

(22) Filed: Jun. 27, 2006

(65) Prior Publication Data

US 2008/0010302 A1 Jan. 10, 2008

(51) Int. Cl.
*G06F 7/00* (2006.01)
*G06F 17/00* (2006.01)
(52) U.S. Cl. ........................ 707/100; 707/101
(58) Field of Classification Search .............. 707/5, 707/100–102, 104.01
See application file for complete search history.

(56) References Cited

U.S. PATENT DOCUMENTS

| | | | |
|---|---|---|---|
| 7,013,311 B2 * | 3/2006 | Hui et al. | 707/104.1 |
| 2006/0053122 A1 | 3/2006 | Korn et al. | |
| 2006/0106793 A1 * | 5/2006 | Liang | 707/5 |

OTHER PUBLICATIONS

Haifeng Jiang et al., "Holistic Twig Joins on Indexed XML Documents", proceedings of the 29th VLDB Conference, Berlin, Germany, 2003.*

Marcus Fondoura et al., "Optimizing Cursor Movement in Holistic Twig Joins", CIKM'05, Oct. 31, 2005, Bremen, Germany.*

Shurug Al-Khalifa et al., "Structual Joins: Primaitive for Efficient XML Query Pattern Matching".*

Nicolas Bruno et al., "Holistic Twig Joins: Optimal XML Pattern Matching", ACM Sigmod, Jun. 4-6, 2002.*

* cited by examiner

*Primary Examiner*—Hung T Vy
(74) *Attorney, Agent, or Firm*—Scully, Scott, Murphy & Presser, P.C.; Daniel E. Johnson, Esq.

(57) ABSTRACT

A holistic twig join method with optimal cursor movement is disclosed. The method in one aspect minimizes the number of cursor moves by looking more globally at the query's state to determine which cursor to move next and making virtual moves where a physical move is not needed. The method in another aspect reduces the number of cursor moves by skipping over nodes that do not need to be output.

5 Claims, 3 Drawing Sheets

OPTIMIZING CURSOR MOVEMENT IN HOLISTIC TWIG JOINS

FIELD OF THE INVENTION

The present application generally relates to evaluating path expressions in extended markup language queries (XML).

BACKGROUND OF THE INVENTION

Path expressions can be used to specify values and structural constraints in XML queries. For example both XPath and XQuery, which are tools used to query or identify parts of an XML document, allow users to specify queries using path expressions. A branching path expression can be represented as a query tree, which is structurally matched against XML data. Performing this structural matching as efficiently as possible is one of the key issues in building an XML query engine. There are two common approaches to perform structural matching efficiently. One approach is to use a structural join, where a query tree is decomposed into a set of binary ancestor-descendant or parent-child relationships. The relationships are then evaluated using a binary merge join. Another approach is to use a holistic twig join, which processes a query tree with a single n-ary join.

Holistic twig joins are index-based, typically relying on an inverted index for positional information about XML elements. Cursors are used to access the inverted index and moved in a coordinated way to efficiently find structural matches. Holistic twig joins represent the state of the art for evaluating path expressions in XML queries. Generally, they are self-tuning and do not require a query optimizer. Because each cursor move in an inverted index can trigger I/O, the performance of a twig join is largely determined by how many cursor moves it makes. Yet, the existing twig join algorithms do not optimize along these lines. There has been more focus on minimizing the memory requirements of intermediate results than on minimizing the number of cursors moves. Accordingly, a new holistic twig join method that optimizes cursor movement is desirable. Another shortcoming of existing twig join algorithms is that they assume all nodes in a query tree need to be output. However, an Xquery return clause often requires only a subset of the nodes being matched to be output. Accordingly, a new holistic twig join method that optimizes by only outputting the needed solution is desirable. Additional description of holistic twig join algorithm is provided in N. Bruno, N. Koudas, and D. Srivastava, Holistic twig joins: Optimal xml pattern matching, SIGMOD, 2002 ("Bruno et al."); and H. Jiang, W. Wang, H. Lu, and J. Yu. Holistic twig joins on indexed xml documents, VLDB, 2003 (Jiang et al.), which disclosures are incorporated herein by reference.

BRIEF SUMMARY OF THE INVENTION

A method for optimizing cursor movement in holistic twig joins is disclosed. The method in one aspect includes selecting a minimum cursor having a smallest begin value in an inverted index representing XML document, and corresponding to a path node q in a query tree Q. The method also includes virtually moving all cursors corresponding to one or more nodes in a subtree of Q rooted at q as far forward as possible without missing a solution. The method further includes physically moving a cursor forward in the subtree rooted at q when no further virtual moves are possible without missing a solution. The steps of selecting, virtually moving and physically moving are repeated until a partial solution rooted at q is found. The method further includes outputting one or more stacked full solution that includes q, pushing a cursor corresponding to q onto a stack, and physically advancing the cursor corresponding to q. The steps of selecting, virtually moving, physically moving, outputting, and physically advancing may be repeated until no more solutions are found.

Further features as well as the structure and operation of various embodiments are described in detail below with reference to the accompanying drawings. In the drawings, like reference numbers indicate identical or functionally similar elements.

DETAILED DESCRIPTION

In the present disclosure, the examples are provided using XPath expressions or XQuery fragments. They can be represented by a single query tree and structurally matched against XML data in one pass over an index. These are typically single-document path expressions containing child ('/') axis, descendant ('//') axis, and equality predicates, all of which can be combined using Boolean AND and OR operators. For example, the following following XQuery fragment, which returns the titles of XML articles in 2005 can be represented as a query tree shown in FIG. 3:

--- for $a in //article[year = "2005" or keyword = "xml"]
  for $s in $a//section
    return $s/title;

---

Figure 3:
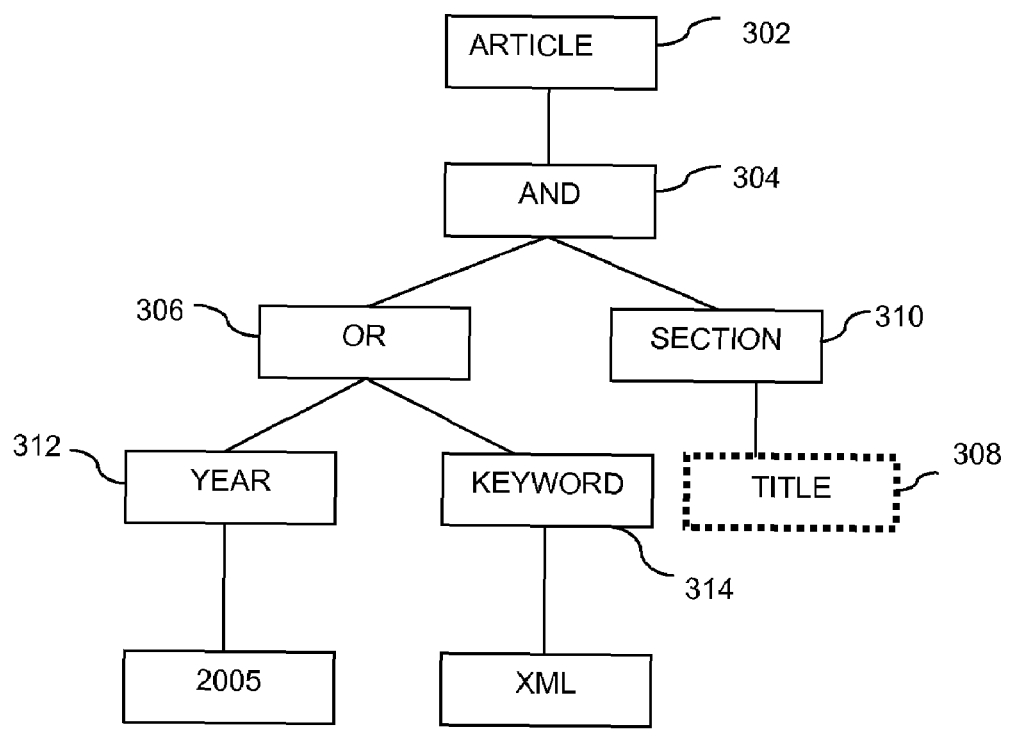
FIG. 3 illustrates an example of a query tree.

This query has three XPath expressions, one in each of the two for clauses, and one in the return clause. FIG. 3 shows the resulting query tree. Each XPath step in FIG. 3 is represented by a path node 302, 310, 312, 314. There are also AND and OR branching nodes 304, 306, which specify that all or at least one of the subpatterns below the node must be matched, respectively. The dotted lines 308 are used to indicate that a path node corresponds to an extraction point, i.e., it is returned by the query. In general a query tree can have more than one extraction point since the for-let-where block of XQuery returns tuples of bindings.

XML data is also commonly represented as a tree, with nodes corresponding to text values, elements, or attributes, and edges capturing the nesting of elements. The position of XML data nodes are used by holistic twig joins to do structural matching. The position of an XML data node can be encoded in different ways. One example way is to use the well-known BEL encoding, where a node's begin, end, level forms its position. Another way is the Dewey encoding. In one embodiment, the method in the present application is illustrated using BEL encoding, however, other encoding methods can be used.

Holistic twig joins have been implemented over several indexing structures. In one embodiment, the method in the present application is illustrated using a standard inverted index. Inverted indexes are frequently used in information retrieval and XML systems alike. Briefly, an inverted index has one posting list per distinct token in the dataset, where a token can be a text value, attribute, or element tag. A posting list contains one posting for each occurrence of its token in the dataset and is sorted by position. Stepping through the posting list for a token T will enumerate the positions of every occurrence of T in order, by document and then within document. In one embodiment, each posting list is itself indexed, for example, with a B-tree, so that searching for a particular position within a posting list is efficient.

Thus, in one embodiment, the method of the present disclosure operates on a query tree and a tree that represents XML data. To find documents that structurally match a query tree Q, a holistic twig join associates each path node q with the posting list in the inverted index whose token matches q. A cursor is opened for each of these posting lists, and then moved in a coordinated way to find documents that structurally match Q. Parent-child and ancestor-descendant constraints imposed by the query are checked by looking at the current positions of cursors. The output of a holistic twig join is a stream of tuples, where each tuple corresponds to a solution, that is, a set of data nodes that structurally match the path nodes in Q. In existing twig join algorithms, all possible solutions are output.

The method and system of the present disclosure herein may also be referred to as TwigOptimal, however, it should be understood that any other naming convention may be used and that such names do not in any way affect the scope of the invention. In one embodiment of the present disclosure, the evaluation state of TwigOptimal is a triplet <Q, C, S>, where Q is the query tree being evaluated, C is the set of cursors for accessing the inverted index, and S is a set of stacks for constructing solutions. Data nodes that are part of a solution are stacked on S and output when a full solution is found.

In one embodiment, an index cursor Cq and a stack Sq are associated with each path node q in Q. Cq points to the current posting for q, while Sq is used to remember the data nodes for q that are part of a solution. Each stack entry also has a pointer to an entry in an ancestor stack, which is used by TwigOptimal to output a solution. The position of a cursor Cq is accessed via Cq.begin, Cq.end, and Cq.level, and similarly for a stacked node in Sq.

Parent-child or ancestor-descendant constraints are checked by looking at BEL values. A cursor Cp contains another cursor Cq if and only if (iff) Cp.begin <=Cq.begin and Cp.end>=Cq.end. Similarly, a stack Sp contains Cq if there is some entry in Sp that contains Cq.

For each cursor Cq, the method Cq.forwardTo(pos) moves Cq forward from its current position to the first position greater than or equal to pos. This can trigger I/O as Cq physically seeks to pos. In one embodiment, to optimize its cursor movements, TwigOptimal also uses virtual cursor moves that, unlike physical cursor moves, do not trigger I/O. Instead, a virtual move on Cq simply sets Cq.begin without physically moving Cq. This will be made clearer shortly. Cq.virtual is set to true whenever Cq is virtually moved and reset to false whenever Cq is physically moved.

Unlike path nodes, each branching node in Q is not associated with a posting list in the inverted index. However, each branching node does have a cursor, which is used to pass along the position of its parent or a child cursor when TwigOptimal is deciding which cursor to move next. Consequently, in one embodiment, the cursor of a branching node is always virtual.

By maintaining a cursor for each branching node, TwigOptimal does not need to distinguish between path nodes and branching nodes in most cases, which in turn simplifies the method.

Figure 1:
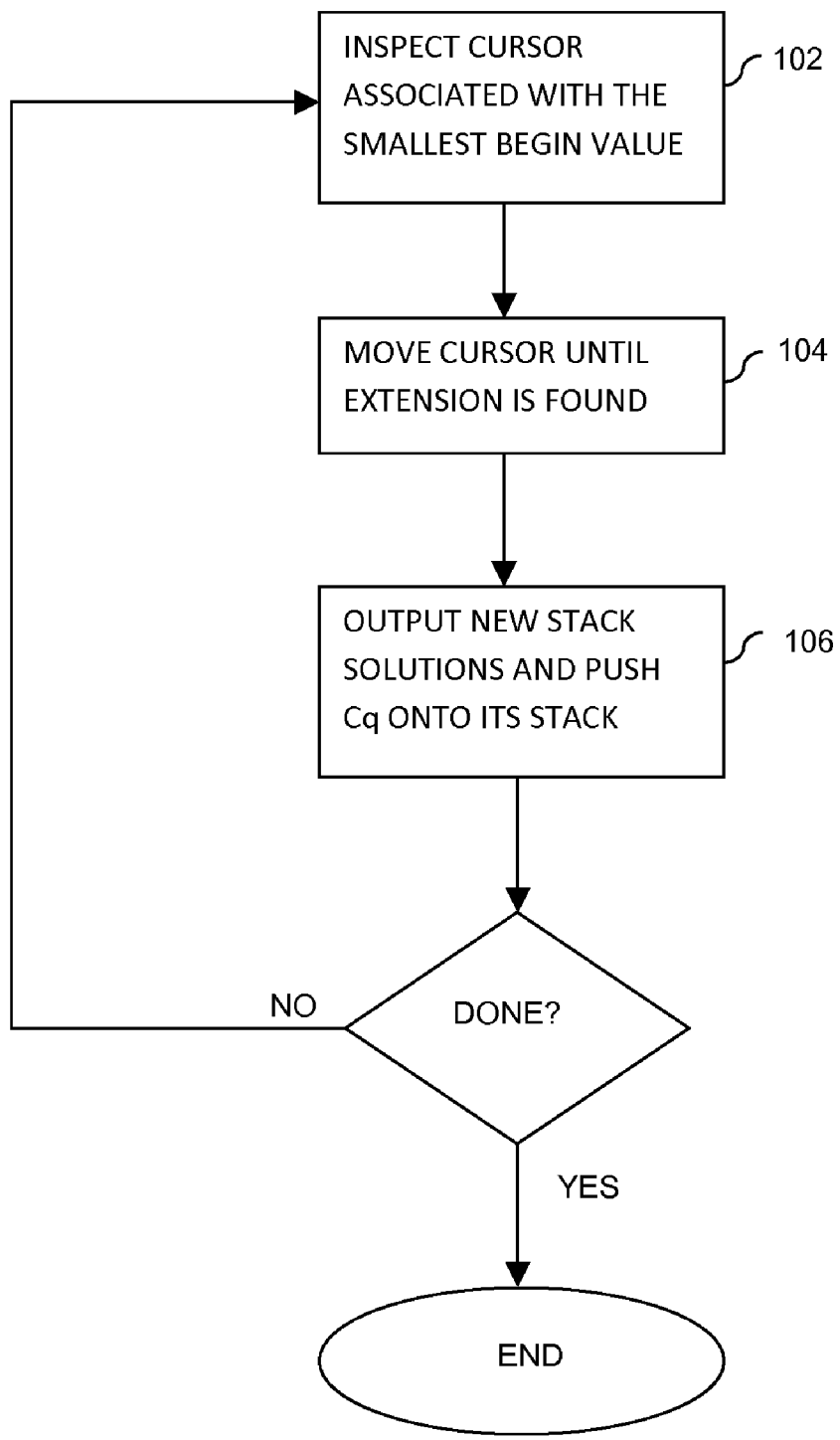
FIG. 1 illustrates a method of optimizing cursor movement in holistic twig joins in one embodiment.

FIG. 1 illustrates a method of optimizing cursor movement in holistic twig joins in one embodiment. Steps in FIG. 1 are described below in conjunction with the following sample code fragments for optimizing cursor movements.

```
ExecuteQuery( )
1.   initialize all cursors and stacks;
2.   while (not done) {
3.     q = the path node in Q associated with the min cursor;
4.     while (Extension(q) == false) {
5.       MoveCursors(q);
6.       q = the path node in Q associated with the min cursor;
7.     }
8.     OutputAndPush(q);
9.     Cq.forwardTo(Cq.begin + 1);
10.  }
```

In the above code fragment, ExecuteQuery( ), forms the entry point and main loop of TwigOptimal. It initializes each cursor to their first posting (line 1), then it repeatedly inspects the path node q corresponding to the min cursor (line 3) at 102, that is, the cursor with the smallest begin value, until is has found and output all solutions. To find and output solutions, the cursors are moved until an extension for q is found (lines 4-7) at 104. An extension for q is basically a partial solution rooted at q. When an extension for q has been found, the cursor positions in the subtree rooted at q are guaranteed to be a part of a solution. In addition, the stacks of q's ancestors contain the position of data nodes that, when combined with the extension for q, forms a full solution. Once an extension has been found, OutputAndPush( ) is called (line 8) to output any new stacked solutions and push Cq onto its stack at 106. Cq is only stacked when it is part of a solution. Finally, Cq is advanced to its next physical location (line 9) to start the search at 102 for another solution. The main loop terminates when the end of one or more posting lists is reached, allowing the algorithm to conclude that no more solutions can be found.

Extension( ), which is shown below, checks whether the cursor positions in the subtree rooted at q form an extension. {C} is the set path of cursors in the subtree rooted at q. In one embodiment, for the subtree rooted at q to form an extension, Cq must be contained by its parent's stack Sp, all the cursors in {C} must be real (not virtual), and all the cursors in {C} must recursively satisfy the containment constraints of Q (line 3). In the latter case, a cursor with an AND under it needs to contain all its children cursors, while a cursor with an OR under it needs to contain at least one of its children cursors.

```
Extension(q)
1.   p = the parent of q;
2.   {C} = the set of descendant path cursors of Cq in Q;
3.   if (Sp contains Cq and
        all the cursors in {C} are real and
        {C} satisfies Q's containment constraints) {
4.     return true;
5.   }
6.   else {
7.     return false;
8.   }
```

Figure 2:
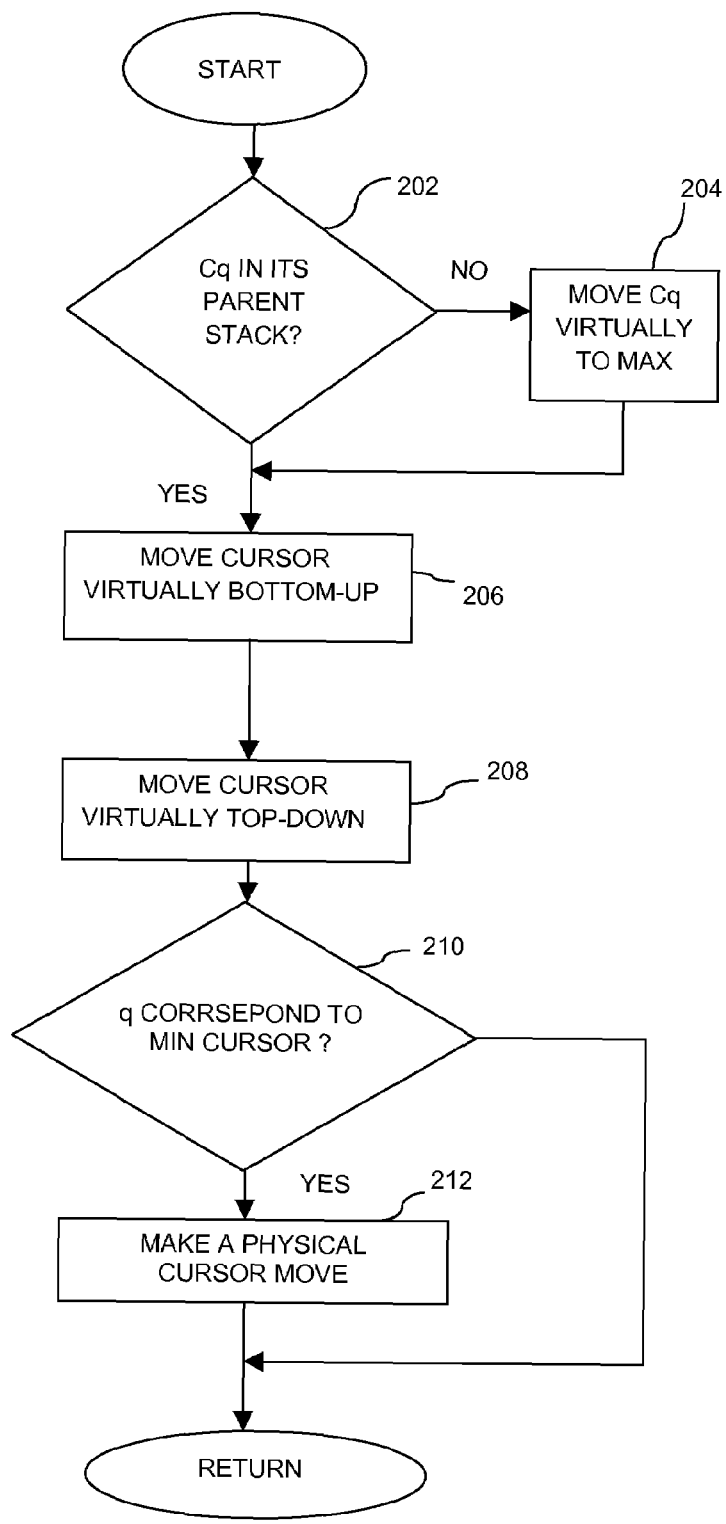
FIG. 2 illustrates a method for moving cursor in one embodiment of the present disclosure.

TwigOptimal calls MoveCursors(q) in its main loop as it searches for an extension, where q corresponds to the min cursor. MoveCursors( ) generally tries to move the cursors in the subtree rooted at q to the next extension for q, if any. To avoid I/O, this is done using virtual cursor moves. A physical cursor move is made only when further virtual progress becomes impossible. FIG. 2 illustrates a method for moving cursor in one embodiment of the present disclosure. A sample code fragment for MoveCursors( ) is shown below. FIG. 2 is described in conjunction with the sample code fragment.

```
MoveCursors(q)
    1.  p = the parent of q;
    2.  if (Sp does not contain Cq) {
    3.      Cq.begin = max(Cq.begin, Cp.begin + 1);
    4.      Cq.virtual = true;
    5.  }
    6.  MoveCursorsBottomUp(q);
    7.  MoveCursorsTopDown(q);
    8.  if (q still corresponds to the min cursor) {
    9.      Cb = the best virtual cursor to physically
            move among Cq and its descendents;
    10.     Cb.forwardTo(Cb.begin);
    11.     Cb.virtual = false;
    12. }
```

Two passes over the subtree rooted at q are made to virtually move the cursors, a bottom-up pass (line 6) and a top-down pass (line 7). The two passes over the subtree globally discover the furthest each cursor can be moved forward without missing an extension for q. This is in contrast to existing twig join algorithms, where cursors are moved in a localized way, only looking at the positions of one parent-child pair of cursors at a time. In one embodiment, MoveCursors( ) begins by checking whether Cq is contained by its parent stack (line 2) at 202. If Cq is not contained by its parent stack, there is no solution at the current position of Cq. Accordingly, Cq is virtually moved at 204 to the greater of Cq.begin or Cp.begin+1, which is the most Cq can be moved forward without missing an extension for q. Next, the cursors are virtually moved bottom-up at 206 and top-down (lines 6-7) at 208. At 210 a check is made to see whether q still corresponds to the min cursor (line 8). If so, then further virtual progress stops, at which point a physical cursor move is made (lines 9-11) at 212. On exit, MoveCursors( ) may or may not have actually found an extension for q. This is checked in the main loop of TwigOptimal in FIG. 1. In one embodiment, when MoveCursors( ) is forced to make a physical cursor move, it picks the "best" virtual cursor in the subtree rooted at q to move (line 9). This is, for example, the cursor that is predicted to move the furthest. Various heuristics that are known or will be known can be used to determine the best cursor to move. Some examples are described in Jiang et al.

MoveCursorsBottomUp( ), which is shown below recursively performs a bottom-up pass over the subtree under consideration. The goal of this pass is to try and move each parent cursor forward so it contains its children cursors. If q is an AND node (line 4), then Cq must contain the cursor of its max child in order for there to be an extension. Similarly, if q is an OR node (line 8), then Cq must contain the cursor of its min child. If q is a path node with a child (line 12), then Cq must contain that child's cursor.

```
MoveCusorsBottomUp(q)
    1.  for (each child c of q) {
    2.      MoveCusorsBottomUp(c);
    3.  }
    4.  if (q is an AND node) {
    5.      m = the child of q with the max cursor;
    6.      Cq.begin = Cm.begin;
    7.  }
    8.  else if (q is an OR node) {
```
-continued
```
    9.      m = the child of q with the min cursor;
    10.     Cq.begin = Cm.begin;
    11. }
    12. else if(q has a child) {
    13.     c = the only child of q;
    14.     if (Cq.end < Cc.begin) {
    15.         Cq.begin = max(Cq.begin, Cq.end + 1);
    16.         Cq.virtual = true;
    17.     }
    18. }
```

In one embodiment, each branching node's cursor is used to pass along the position of its parent cursor or a child cursor. Here, in the case of an AND node, Cq is used to pass up the begin value of its max child cursor (lines 5-6). Similar action is taken in the case of an OR node with its min child cursor (lines 9-10). Finally, if q is a path node with a child, and Cq.end falls before that child's cursor, then Cq is virtually moved to the max of Cq.begin or Cq.end +1 (lines 15-16), which is the most Cq can be moved forward without missing an extension. The max is needed (line 15) to deal with the case where a previous call to MoveCursors has already virtually moved Cq.begin past Cq.end. After MoveCursorsBottomUp( ) finishes, each cursor will have been virtually moved as far forward as its children cursors will allow it to be moved without missing an extension. MoveCursorsTopDown( ), shown below is then called to recursively perform the top-down pass over the subtree under consideration. The goal of this pass is to try and move each child cursor forward so it is contained by its parent cursor.

```
MoveCusorsTopDown(q)
    1.  for (each c in children of q) {
    2.      if (c is an AND or an OR node) {
    3.          Cc.begin = Cq.begin;
    4.      }
    5.      else if (Cc.begin < Cq.begin and Cc is not contained by Sq) {
    6.          Cc.begin = Cq.begin + 1;
    7.          Cc.virtual = true;
    8.      }
    9.      MoveCursorsTopDown(c);
    10. }
```

In MoveCursorsTopDown( ), c and q correspond to the current child and parent nodes being examined, respectively. If c is a branching node, then the child cursor Cc is used to pass down the position of the parent cursor Cq (line 3). Else, if Cc.begin falls before Cq and is not contained by its parent stack Sq, then Cc is virtually moved to Cq.begin+1 (lines 5-8), which is the most Cc can be moved forward without missing an extension. Sq needs to be checked for containment in this case to guard against missing solutions when there is recursive data for q.

Solutions are output and pushed onto the stacks in OutputAndPush( ), which is shown below. Before the cursor of node q is stacked (line 8), a check is made to see if q corresponds to the root of Q. If so, then one or more solutions are output before the new root cursor is stacked (lines 2-6).

```
OutputAndPush(q)
    1.  if (q == Q.root) {
    2       while (Sq.top( ) is not an ancestor of Cq) {
    3.          output solutions with Sq.top( );
    4.          Sq.pop( );
```

```
5.          remove nodes from all stacks lacking a root;
6.      }
7.  }
8.  Sq.push(Cq);
```

The simple stacking method shown above may be further optimized for space, for example by using any known or will be known methods.

Existing twig join algorithms assume that all path nodes in a query tree need to be output. However, an XQuery return clause often requires only a subset of the path nodes being matched to be output. By being aware of extraction points and skipping over data nodes that do not need to be output, the number of cursor moves performed by a twig join can be dramatically reduced. Briefly, extraction points refer to what is returned by the query. In general a query tree can have more than one extraction point since the for-let-where block of XQuery returns tuples of bindings. In one embodiment, extraction points can be used to improve TwigOptimal's performance by the replacing line 9 of ExecuteQuery( ) with lines 9a to 9j as shown below.

```
9a.  if (q is not an extraction point and
        no descendent of q is an extraction point) {
9b.     p = parent of q;
9c.     virtually forward q
            and all its descendant path cursors to Cp.begin + 1;
9d.  }
9e.  else {
9f.     Cq.forwardTo(Cq.begin + 1);
9g.     if (no descendent of q is an extraction point) {
9h.         virtually forward q's descendant
                path cursors to Cq.begin + 1;
9i.     }
9j.  }
```

To understand the code segment above, let q be a path node in the query tree with parent p and consider the four possibilities for q and its descendants:

1. Neither q nor any of its descendants in the query tree are extraction points.
2. Node q is an extraction point but none of its descendants are extraction points.
3. Both q and some descendant of q are extraction points.
4. Node q is not an extraction point but some descendant of q is an extraction point.

Case 1 is handled by lines 9a-9d. In this case, it should be clear that TwigOptimal does not need to find all the extensions rooted at q. Once an extension for q has been found, Cq and all its descendant cursors can be virtually moved within Cp (line 9c). Case 2 is handled by lines 9e-9i. In this case, it should be clear that TwigOptimal does not need to find all the extensions below q. After physically moving Cq (line 9f), all its descendant cursors can be virtually moved to within Cq (line 9h). Case 3 and case 4 fall through the first part of the if-statement and are handled the same as in the version of ExecuteQuery( ) without extraction points, that is, just line 9f is executed. Also, although it is not shown, OutputAndPush( ) changes with extraction points. For example, if neither q nor any of its descendants are extraction points, then Cq is not stacked.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method for optimizing cursor movement in holistic twig joins, comprising:

selecting a minimum cursor having a smallest begin value in an inverted index representing XML data and corresponding to a path node q in a query tree Q;

virtually moving all cursors corresponding to one or more nodes in a subtree of Q rooted at q as far forward as possible without missing a solution;

physically moving a cursor forward in the subtree rooted at q when no further virtual moves are possible without missing a solution;

repeating the steps of selecting a minimum cursor and moving cursors forward until a partial solution rooted at q is found;

outputting one or more stacked full solutions that includes q; pushing a cursor corresponding to q onto a stack; physically advancing the cursor corresponding to q;

repeating the steps of selecting a minimum cursor, virtually moving, physically moving, outputting, pushing a cursor, and physically advancing the minimum cursor until no more solutions are found, wherein the partial solution rooted at q is found if no cursors in a set path of cursors in a subtree rooted at q are virtual, a cursor at q is contained by its parent's stack and the set path of cursors in a subtree rooted at q satisfy containment constraints of a query tree being evaluated.

2. The method of claim 1, wherein the step of virtually moving includes two passes over the subtree of Q rooted at q globally to move a cursor virtually furthest forward without missing a partial solution rooted at q.

3. The method of claim 1, wherein the step of physically advancing includes skipping over one or more data nodes that do not need to be output.

4. The method of claim 3, wherein the step of skipping over one or more data nodes includes virtually moving the cursor over the one or more data nodes that do not need to be output.

5. A program storage device readable by machine, tangibly embodying a program of instructions executable by the machine to perform a method of optimizing cursor movement in holistic twig joins, comprising:

selecting a minimum cursor having a smallest begin value in an inverted index representing XML data and corresponding to a path node q in a query tree Q;

virtually moving all cursors corresponding to one or more nodes in a subtree of Q rooted at q as far forward as possible without missing a solution;

physically moving a cursor forward in the subtree rooted at q when no further virtual moves are possible without missing a solution;

repeating the steps of selecting a minimum cursor and moving cursors forward until a partial solution rooted at q is found; outputting one or more stacked full solutions that includes q; pushing a cursor corresponding to q onto a stack;

physically advancing the cursor corresponding to q; repeating the steps of selecting a minimum cursor, virtually moving, physically moving, outputting, pushing a cursor, and physically advancing the minimum cursor until no more solutions are found, wherein the partial solution rooted at q is found if no cursors in a set path cursors in a subtree rooted at q are virtual, a cursor at q is contained by its parent's stack and the set path of cursors in a subtree rooted at q satisfy containment constraints of a query tree being evaluated.

* * * * *